(12) United States Patent
Nishida et al.

(10) Patent No.: US 9,300,154 B2
(45) Date of Patent: Mar. 29, 2016

(54) POWER MANAGEMENT SYSTEM

(71) Applicant: MITSUBISHI HEAVY INDUSTRIES, LTD., Tokyo (JP)

(72) Inventors: Takehiko Nishida, Nagoya (JP); Tetsuro Shigemizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 312 days.

(21) Appl. No.: 13/767,385

(22) Filed: Feb. 14, 2013

(65) Prior Publication Data

US 2013/0221925 A1 Aug. 29, 2013

(30) Foreign Application Priority Data

Feb. 20, 2012 (JP) .................................. 2012-034407

(51) Int. Cl.
*H02J 7/00* (2006.01)

(52) U.S. Cl.
CPC ............. *H02J 7/0063* (2013.01); *H02J 7/0091* (2013.01); *H02J 2007/0098* (2013.01)

(58) Field of Classification Search
CPC ............. H01M 10/44; H01M 10/4207; H01M 10/441; H01M 10/443; H01M 10/482; H01M 10/5008; H02J 2007/0067; H02J 7/0091; H02J 7/0063; H02J 2007/0098
See application file for complete search history.

(56) References Cited

U.S. PATENT DOCUMENTS

| | | | |
|---|---|---|---|
| 2007/0210746 A1* | 9/2007 | Tanjou | 320/112 |
| 2008/0169789 A1* | 7/2008 | Yamabe | 320/136 |
| 2009/0278488 A1* | 11/2009 | Choi et al. | 320/103 |
| 2012/0025770 A1* | 2/2012 | Suzuki et al. | 320/118 |

FOREIGN PATENT DOCUMENTS

| | | |
|---|---|---|
| CN | 101425699 A | 5/2009 |
| CN | 101669230 A | 3/2010 |
| CN | 202121029 U | 1/2012 |
| JP | 2005-198423 A | 7/2005 |
| JP | 2006-101674 A | 4/2006 |
| JP | 2008-295291 A | 12/2008 |
| JP | 2009-201232 A | 9/2009 |
| JP | 2011-205827 A | 10/2011 |
| WO | 2010/103816 A1 | 9/2010 |

OTHER PUBLICATIONS

Chinese Office Action dated Oct. 21, 2014, issued in Chinese Patent Application No. 2013100516222, w/partial English translation (10 pages).
Japanese Office Action dated Sep. 24, 2013, issued in Japanese Patent Application No. 2012-034407, w/ English translation (8 pages).

* cited by examiner

*Primary Examiner* — Nha Nguyen
(74) *Attorney, Agent, or Firm* — Westerman, Hattori, Daniels & Adrian, LLP

(57) ABSTRACT

A power management system includes: a first power source that includes a first storage cell; a second power source that includes a second storage cell; a power load that is driven with first power output by the first power source and second power output by the second power source; and an integrated control device that controls the first power and the second power such that a first cell temperature of the first storage cell is substantially the same as a second cell temperature of the second storage cell.

3 Claims, 4 Drawing Sheets

POWER MANAGEMENT SYSTEM

TECHNICAL FIELD

The present invention relates to a power management system, and more particularly, to a power management system (that is, an energy management system) that outputs predetermined power from a plurality of power sources.

Priority is claimed on Japanese Patent Application. No. 2012-034407, filed Feb. 20, 2012, the content of which is incorporated herein by reference.

BACKGROUND ART

In recent years, power management systems that add the power of a plurality of power sources such as thermal power plants or wind power plants located in a plurality of areas, determine a burden ratio of the power sources at predetermined power when transmitting the predetermined power to power loads, and control the outputs of the power sources have been developed (see Patent Literature 1).

As a technology for adjusting the burden ratio, for example, a technology for performing control such that each output current is equal to or less than an allowable current value in consideration of the temperatures and charging rates (that is, SOC or state of charge) of a plurality of storage cell modules has been developed (see Patent Literature 2).

Further, when an output current of a storage cell is controlled, in order to prevent the storage cell from deteriorating, a technology for performing control of reducing the output current so that the output current of a storage cell is equal to or less than the power upper limit value when the temperature of the storage cell is high has been developed (see Patent Literature 3).

CITATION LIST

Patent Literature

[Patent Literature 1] Japanese Unexamined Patent Application, First Publication No. 2005-198423
[Patent Literature 2] Japanese Unexamined Patent Application, First Publication No. 2011-205827
[Patent Literature 3] Japanese Unexamined Patent Application, First Publication No. 2006-101674

SUMMARY OF INVENTION

Problem to be Solved by the Invention

In the technologies according to the related art, however, when a plurality of power sources including storage cells are disposed in a plurality of areas and a power load is driven with the outputs of the power sources, the storage cells of some power sources may deteriorate faster than the storage cells of the other power sources in some cases. This is because the technologies according to the related art focus on outputting the powers within a range that does not exceed the allowable current value or the power upper limit value of a storage cell included in each power source, and a variation of the deterioration in the storage cells within the range between the power sources is not considered.

When the storage cells of some power sources gradually deteriorate, a power management system including the plurality of power sources is interrupted, for example, to exchange the deteriorated storage cells. In terms of an operation of the power management system, frequent occurrence of the interruption should be avoided when possible.

An object of the invention is to provide a power management system capable of performing control such that a variation of deterioration in storage cells between power sources is controlled and the storage cells deteriorate substantially uniformly.

Means for Solving the Problem

According to a first aspect of the invention, a power management system includes: a first power source that includes a first storage cell; a second power source that includes a second storage cell; a power load that is driven with first power output by the first power source and second power output by the second power source; and an integrated control device that controls the first power and the second power such that a first cell temperature of the first storage cell is substantially the same as a second cell temperature of the second storage cell.

In the configuration, the integrated control device can appropriately control the values of the first power which is the output of the first power source and the second power which is the output of the second power source such that the temperatures of the storage cells included in the first and second power sources are substantially the same.

Accordingly, deterioration speeds of the storage cells between the power sources can be substantially uniform.

According to a second aspect of the invention, in the power management system according to the first aspect, the power load may transmit request power information regarding power necessary for the driving to the integrated control device. The integrated control device receiving the request power information may perform the control by calculating the values of the first power and the second power such that the integrated control device acquires first storage cell intrinsic information including the first cell temperature and first temperature of a disposition place of the first power source in regard to the first storage cell from the first power source, acquires second storage cell intrinsic information including the second cell temperature and second temperature of a disposition place of the second power source in regard to the second storage cell from the second power source, performs calculation using the request power information, the first storage cell intrinsic information, the first temperature, the second storage cell intrinsic information.

According to a third aspect of the invention, the first storage cell intrinsic information may include at least a voltage value of the first storage cell, an internal resistance value of the first storage cell, a heat transfer coefficient of the first storage cell, a heat transfer area of the first storage cell, and a specific heat of the first storage cell, and a mass of the first storage cell. The second storage cell intrinsic information may include at least a voltage value of the second storage cell, an internal resistance value of the second storage cell, a heat transfer coefficient of the second storage cell, a heat transfer area of the second storage cell, and a specific heat of the second storage cell, and a mass of the second storage cell.

According to a fourth aspect of the invention, the first power source may include a first power conditioner that receives a direct-current output of the first storage cell, converts the direct-current output into an alternating current, and outputs the alternating current as the first power. The second power source may include a second power conditioner that receives a direct-current output of the second storage cell, converts the direct-current output into an alternating current, and outputs the alternating current as the second power.

According to a fifth aspect of the invention, the first storage cell may be a first assembled cell in which a plurality of storage cells are connected in series and the second storage cell may be a second assembled cell in which a plurality of storage cells are connected in series. The first cell temperature may be a cell temperature of the storage cell indicating highest temperature among the plurality of storage cells of the first assembled cell. The second cell temperature may be a cell temperature of the storage cell indicating highest temperature among the plurality of storage cells of the second assembled cell.

Effects of the Invention

The above-described power management system can perform the control such that the variation of the deterioration in the storage cells between the power sources can be controlled and the storage cells can deteriorate substantially uniformly.

DESCRIPTION OF EMBODIMENTS

A power management system according to an embodiment of the invention includes a plurality of power sources (that is, power storage systems to be described below) including storage cells and controls the values of power output from the respective power sources such that the cell temperatures of the storage cells of the power sources are substantially the same between the power sources.

Hereinafter, a detailed description will be made with reference to the drawings.

Figure 1:
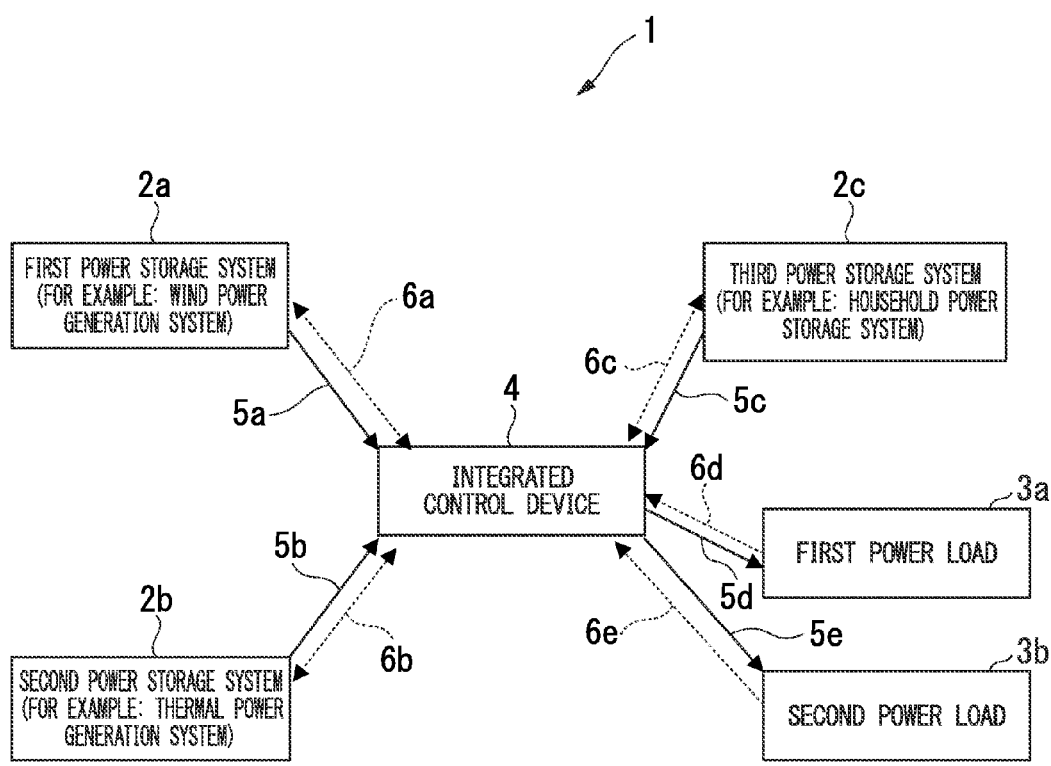
FIG. 1 is a diagram illustrating an overview of a power management system according to a first embodiment of the invention.

FIG. 1 is a diagram illustrating the configuration of a power management system 1 according to an embodiment.

The power management system 1 includes a plurality of power storage systems 2 (here, a first power storage system 2a, a second power storage system 2b, and a third power storage system 2c) that serve as power sources, a plurality of power loads 3 (here, a first power load 3a and a second power load 3b) that are driven by the power output from the power storage systems 2 via power lines 5 (here, power lines 5a to 5e), and an integrated control device 4 that receives request power information regarding power requested by the power loads 3 and power storage system information regarding a storage cell transmitted from each power storage systems via signal lines 6 (here, signal lines 6a to 6e), calculates the power burdened on each power storage system, and controls each power storage system 2 via each signal line 6 so that each power storage system outputs the power based on the calculation result. When each power storage system outputs the power, the integrated control device 4 appropriately controls each power storage systems such that the power storage systems 2 can output the power in synchronization therewith.

The power storage system 2 is a system that can store power in a storage cell and can appropriately output the power from the storage cell. For example, the power storage system 2 may be a power storage system that includes a storage cell equipped in a power plant (a thermal power plant, a wind power plant, or the like) or may be a household power storage system.

The power load 3 may be a load that is driven by power (including a case in which heat is produced by the power). For example, the power load may be a power motor, a heater, or the like. Here, for example, the power load will be described as a power load driven by an alternating current.

Further, the power line 5 may be a so-called power system.

In the following description, units are written in brackets [ ]. For example, when temperature is expressed based on Kelvin, it is written as [K]. The same also applies to other units. Since the units are in general use, no description thereof will be provided.

Figure 2:
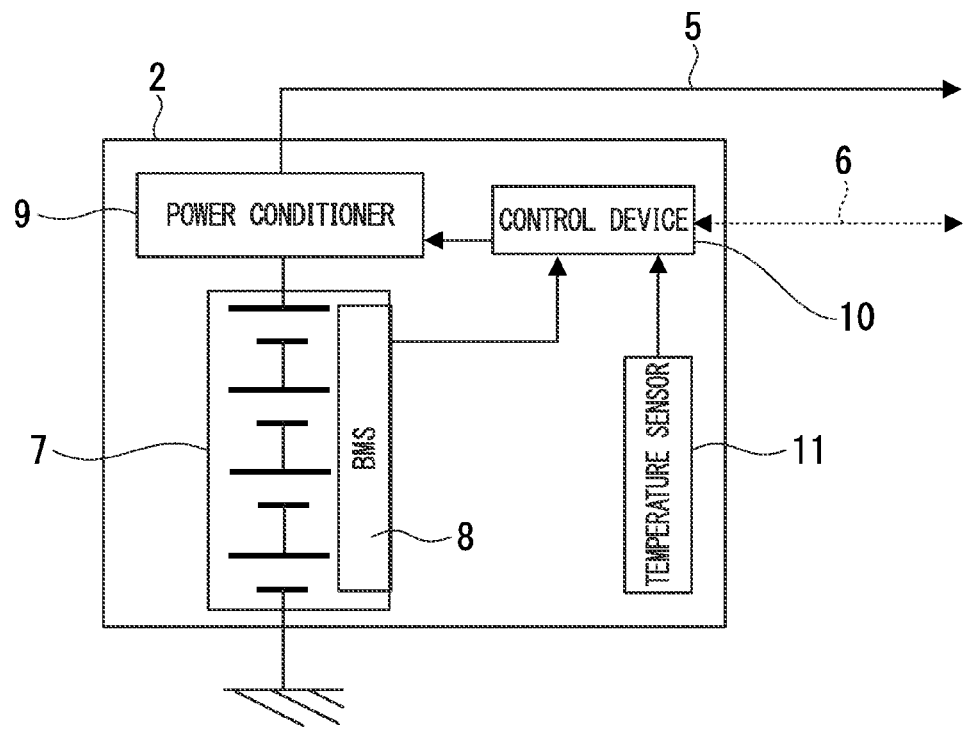
FIG. 2 is a diagram illustrating an overview of the configuration of each power storage systems in FIG. 1.

As shown in FIG. 2, each power storage system 2 includes a storage cell module 7 that includes an assembled cell in which a plurality of storage cells (for example, lithium-ion secondary cells) are connected in series and a temperature sensor 11 that is disposed inside the power storage system and measures temperature Te [K] of the periphery (that is, an environment in which the storage cells are disposed) of the storage cells. The storage cell module 7 includes a battery management system (BMS) 8 and is able to measure an output current value I [A] and a voltage value V [V] of the storage cell module 7 and cell temperature Tc [K] of each storage cell using various sensors (not shown). The BMS 8 of each power storage system 2 includes a memory device (for example, a non-volatile memory) (not shown) that stores storage cell intrinsic information such as an internal resistance R [Ω], a heat transfer coefficient H [W/(m²×K)], a heat transfer area A [m²], a specific heat C [J/(kg×K)], and a mass M [kg] of each storage cell included in the corresponding storage cell module in advance. The storage cell intrinsic information is information intrinsic to the corresponding storage cell and the values can be changed depending on a kind, a material, or the like of the storage cell.

Each power storage system 2 further includes a control device 10 that receives the cell temperature Tc (here, to facilitate the description, an average value of the cell temperatures of the plurality of storage cells included in a given power storage system 2 is set as the cell temperature Tc) measured by the BMS 8, storage cell modulation information regarding the voltage value V of the storage cell module, and temperature information regarding the temperature Te measured by the temperature sensor 11, adds the storage cell intrinsic information to the cell temperature Tc, the storage cell module information, and the temperature information to set storage cell system information, as described above, and transmits the storage cell system information to the integrated control device 4 via the signal line 6. The control device 10 receives output information based on the calculation result from the integrated control device 4 via the signal line 6 and appropriately controls an output of a power conditioner 9 inside the power storage system including the control device 10.

In the following description, a to c are suffixed to the number or sign of each constituent element to clarify in which power storage system the constituent element is included among the first power storage system 2a, the second power storage system 2b, and the third power storage system 2c. For example, in the case of the control device 10, the control device included in the first power storage system 2a is referred to as a control device 10a, the control device included in the second power storage system 2b is referred to as a control device 10b, and the control device included in the third power storage system 2c is referred to as a control device 10c. Further, in the case of the temperature Te, the temperature of the inside of the first power storage system 2a is referred to as temperature Tea, the temperature of the inside of the second power storage system 2b is referred to as temperature Teb, and the temperature of the inside of the third power storage system 2c is referred to as temperature Tec. Furthermore, in the case of the heat transfer coefficient H, the heat transfer coefficient of the storage cell of the first power storage system 2a is referred to as Ha, the heat transfer coefficient of the storage cell of the second power storage system 2b is referred to as Hb, and the heat transfer coefficient of the storage cell of the third power storage system 2c is referred to as Hc.

Next, the control of each power storage system 2 performed by the integrated control device 4 will be described by giving a specific example.

First, when the power loads 3 requests the integrated control device 4 to transmit power, the power loads 3 transmit the request power information to the integrated control device 4. Accordingly, the integrated control device 4 receives first request power information from the first power load 3a via the signal line 6d and receives second request power information from the second power load 3b via the signal line 6e. Here, the description will be made on the assumption that a power value P1 is a power value requested by the first request power information, a power value P2 is a power value requested by the second request power information, and a total sum value Pt (here a value of P1+P2) is a sum value, that is, a total value of the power requested from the power loads 3.

After receiving the request power information, the integrated control device 4 transmits a power storage system information request signal to each power storage system 2 so that the corresponding power storage system information is transmitted to the integrated control device 4. The control device 10 of each power storage system 2 receiving the power storage system information request signal transmits the corresponding power storage system information to the integrated control device 4. Thus, the integrated control device 4 receives all power storage system information.

Specifically, the integrated control device 4 receives information regarding the cell temperature Tea, the voltage value Va, the temperature Tea, the internal resistance Ra, the heat transfer coefficient Ha, the heat transfer area Aa, the specific heat Ca, and the mass Ma in regard to the storage cell module 7a and the like of the first power storage system 2a. Further, the integrated control device 4 receives information regarding the cell temperature Tcb, the voltage value Vb, the temperature Teb, the internal resistance Rb, the heat transfer coefficient Hb, the heat transfer area Ab, the specific heat Cb, and the mass Mb in regard to the storage cell module 7b and the like of the second power storage system 2b. Furthermore, the integrated control device 4 receives information regarding the cell temperature Tcc, the voltage value Vc, the temperature Tec, the internal resistance Rc, the heat transfer coefficient Hc, the heat transfer area Ac, the specific heat Cc, and the mass Mc in regard to the storage cell module 7c of the third power storage system 2c.

Based on all of the received power storage system information, the integrated control device 4 calculates the power values respectively burdened on the power storage systems with respect to the total sum value Pt of the power requested from the power loads 3. The power management system according to this embodiment performs control such that a variation of deterioration of the storage cells can be prevented and the lifespans of all the storage cells can be prolonged in the plurality of power storage systems for which the installation places are spaced apart from each other and the environments are different. Specifically, the control is performed such that the cell temperatures of the storage cells between the power storage systems can be uniform, that is, the cell temperatures are substantially the same.

Accordingly, when the integrated control device 4 performs the calculation, the integrated control device 4 controls an output P[W] of each power storage system such that the cell temperatures Tc have the same value over time for the storage cells of any power storage system, that is, the cell temperatures Tc are saturated to a constant value. For example, the integrated control device 4 performs the control using a result of Calculation 1 or Calculation 2 to be described below.

Then, Calculation 1 and Calculation 2 performed by the integrated control device 4 will be described in detail. First, Calculation 1 will be described.

[Calculation 1]

On the assumption that I [A] is a current value output from a storage cell, a temperature change amount ΔTc of the storage cell per unit time Δt is generally expressed as follows.

$$(\Delta Tc/\Delta t)=\{1 \times I \times R - H \times A \times (Tc-Te)\}/(C \times M) \quad (1)$$

Here, H, A, C, M, and R are fixed values and Te is a measured value and a fixed value. Only I and Tc are functions that change over time t.

Accordingly, when the cell temperature Tc is saturated to the constant value, the left side of Expression (1) can be set to 0. Here, when Expression (1) is transformed, the following expression is obtained.

$$Tc=\{(I \times I \times R)/(H \times A)\}+Te \quad (2)$$

In Expression (2), since the cell temperatures Tc are controlled such that the cell temperatures Tc have the same value in the storage cells of any power storage system, here, Ts is assumed to be the cell temperature at the time of saturation. In Expression (2), since the current value I is also the value of a current at the time of the saturation, is assumed to be the current value I.

Accordingly, Expression (2) becomes the following expression.

$$Ts=\{(Is \times Is \times R)/(H \times A)\}+Te \quad (3)$$

When Expression (3) is expressed by further applying Expression (3) to each power storage systems, the following expression is obtained.

$$\begin{aligned} Ts &= \{(Isa \times Isa \times Ra)/(Ha \times Aa)\} + Tea \\ &= \{(Isb \times Isb \times Rb)/(Hb \times Ab)\} + Teb \\ &= \{(Isc \times Isc \times Rc)/(Hc \times Ac)\} + Tec \end{aligned} \quad (4)$$

Figure 3:
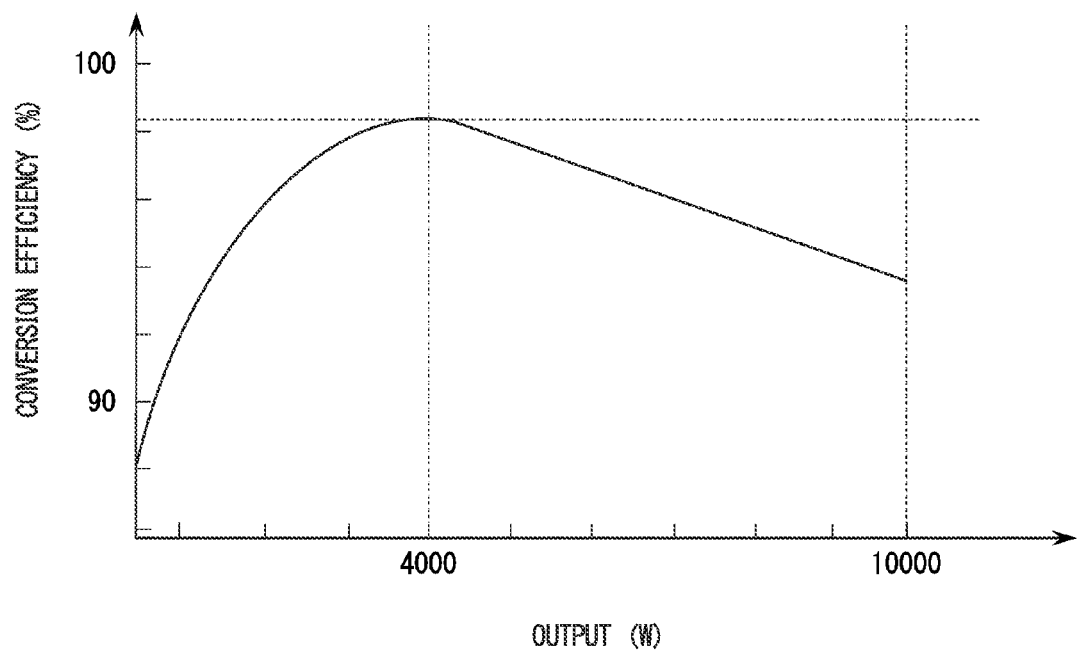
FIG. 3 is a diagram illustrating a relation between an output and conversion efficiency of a general power conditioner.

As a general tendency is shown in FIG. 3, in the power conditioner 9, conversion efficiency is different according to the output Po [W] and a loss occurs. Specifically, in FIG. 3, the power conditioner in the drawing can output up to 1000 W. The output of the best conversion efficiency of the power conditioner is obtained at the time of 4000 W. At this time, the conversion efficiency of the power conditioner is about 98.2%. At the time of the conversion, a loss is bound to occur. Therefore, the conversion efficiency may not be 100%. Accordingly, when the voltage of the storage cell module 7 is a voltage V and a current I flows from the storage cell module 7 to the power conditioner 9 and the direct current is converted into an alternating current, the output from the power conditioner 9 is a value necessarily less than 1×V.

Further, the correlation between the output Po and the conversion efficiency is generally the same, but the details thereof may be different depending on the kinds of power conditioners.

Accordingly, on the assumption that D [%] is assumed to be a conversion efficiency, when the power conditioner 9 performs a given output, and particularly, Ds [%] is assumed to be a conversion efficiency at the time of the saturation, a sum of the outputs Po of all the power storage system is the total sum value Pt of the power requested from the power loads 3. Therefore, the following relation expression can be obtained.

$$Pt = Poa + Pob + Poc \quad (5)$$
$$= \{Isa \times Va \times (Dsa/100)\} +$$
$$\{Isb \times Vb \times (Dsb/100)\} +$$
$$\{Isc \times Vc \times (Dsc/100)\}$$

Further, the following expressions can be obtained.

$$Poa = Isa \times Va \times (Dsa/100) \quad (6)$$

$$Pob = Isb \times Vb \times (Dsb/100) \quad (7)$$

$$Poc = Isc \times Vc \times (Dsc/100) \quad (8)$$

When Expression (4) is used, Isb and Isc can be expressed respectively using Isa as follows. That is, the following expression is obtained.

$$Isb = \sqrt{\frac{Hb \times Ab \times \left\{\left(\frac{Isa \times Isa \times Ra}{Ha \times Aa}\right) + Tea - Teb\right\}}{Rb}} \quad (9)$$

$$Isc = \sqrt{\frac{Hc \times Ac \times \left\{\left(\frac{Isa \times Isa \times Ra}{Ha \times Aa}\right) + Tea - Tec\right\}}{Rc}} \quad (10)$$

Since all of Isa, Isb, and Isc are the values of the currents to be output, the values of the currents are all described as positive values here.

When Expression (9) and Expression (10) are substituted into Expression (5), the following expression is obtained.

$$Pt = Isa \times Va \times (Dsa/100) + \quad (11)$$
$$Vb \times (Dsb/100) \times \sqrt{\frac{Hb \times Ab \times \left\{\left(\frac{Isa \times Isa \times Ra}{Ha \times Aa}\right) + Tea - Teb\right\}}{Rb}} +$$
$$Vc \times (Dsc/100) \times \sqrt{\frac{Hc \times Ac \times \left\{\left(\frac{Isa \times Isa \times Ra}{Ha \times Aa}\right) + Tea - Tec\right\}}{Rc}}$$

In this expression, only Isa is unknown. The other values are preset values, measured values, or the like, and thus are known fixed values. Accordingly, from Expression (11), the integrated control device 4 can calculate the value of Isa.

As the characteristics of the general power conditioner are shown in FIG. 3, the value of Dsa is determined to a specific value when the value of Isa is determined. Therefore, Dsa is a function of Isa. Further, when the value of Isa is determined, the value of Isb is determined from Expression (9). When the value of Isb is determined, the value of Dsb is determined to a specific value. Therefore, Dsb is also a function of Isa. Furthermore, when the value of Isa is determined, the value of Isc is determined from Expression (10). When the value of Isc is determined, the value of Dsc is determined to a specific value. Therefore, Dsc is also a function of Isa. Accordingly, the value of Isa can be determined from Expression (11).

Thus, when Isa is determined, the values of Isb and Isc can be determined from Expression (9) and Expression (10), respectively. Accordingly, the integrated control device 4 can calculate Poa, Pob, and Poc from Expression (6), Expression (7), and Expression (8), respectively. That is, the integrated control device 4 can calculate the power values respectively burdened on the power storage systems 2 with respect to the total sum value Pt of the power requested from the power loads 3 or calculate a burden ratio of each power value burdened on each power storage system 2.

Hereinafter, the description will be made using the following assumed example by considerably simplifying a model to help the understanding of Calculation 1. Although values may be very different from actual values, the values are used to merely facilitate the description, and thus there is no influence on realization of the invention.

First, all of the power storage systems 2 have the same configuration, but the disposition places of the power storage systems 2 are different. Therefore, the temperatures Te [K] are different. Further, when R(H×A)=1 is supposed to be satisfied, all of the power storage systems 2 have the same configuration. Therefore, Expression (4) becomes the following expression.

$$Ts = (Isa \times Isa) + Tea \quad (12)$$
$$= (Isb \times Isb) + Teb$$
$$= (Isc \times Isc) + Tec$$

From Expression (9) and Expression (10), the following expressions are obtained.

$$Isb = \sqrt{(Isa \times Isa) + Tea - Teb} \quad (13)$$

$$Isc = \sqrt{(Isa \times Isa) + Tea - Tec} \quad (14)$$

Here, when V=100 is supposed to be satisfied, the following expressions are obtained from Expression (6), Expression (7), and Expression (8).

$$Poa = Isa \times Dsa \quad (15)$$

$$Pob = Isb \times Dsb \quad (16)$$

$$Poc = Isc \times Dsc \quad (17)$$

Further, from Expression (5) and Expression (13) to Expression (17), the following expression is obtained.

$$Pt = (Dsa \times Isa) + (Dsb \times \sqrt{(Isa \times Isa) + Tea - Teb}) + (Dsc \times \sqrt{(Isa \times Isa) + Tea - Tec}) \quad (18)$$

As the values of Pt and Te of the power management system 1 at the current time, Pt=27828.7, Tea=500, Teb=303, and Tec=104 are assumed.

At this time, when Expression (18) is solved, Isa=98 is obtained.

Here, since all of the power storage systems 2 have the same configuration, all of the power conditioners 9 of the power storage systems 2 are assumed to have the characteristics of FIG. 3. As described above, since the voltage value of any power storage system 2 is also assumed to be V=100, Dsa=93.8 can be obtained from FIG. 3. Since Dsb is the function of Isb and is the function of Isa and Isb=99 is obtained from Expression (13), Dsb=93.7 can be obtained from FIG. 3. Further, since Dsc is the function of Isc and is the function of Isa and Isc=100 is obtained from Expression (14), Dsc=93.6 can be obtained from FIG. 3.

Accordingly, the integrated control device 4 calculates Poa=9192.4 as a burden portion of the first power storage system 2a from Expression (15), calculates Pob=9276.3 as a burden portion of the second power storage system 2b from Expression (16), and calculates Poc=9360 as a burden portion of the third power storage system 2c from Expression (17)

Here, the integrated control device 4 includes a memory device (for example, a non-volatile memory) (not shown) that stores data indicating the above-described characteristics of the power conditioner 9 as a map. The integrated control device 4 appropriately accesses the memory device and uses the data at the time of the above-described calculation.

Figure 4A:
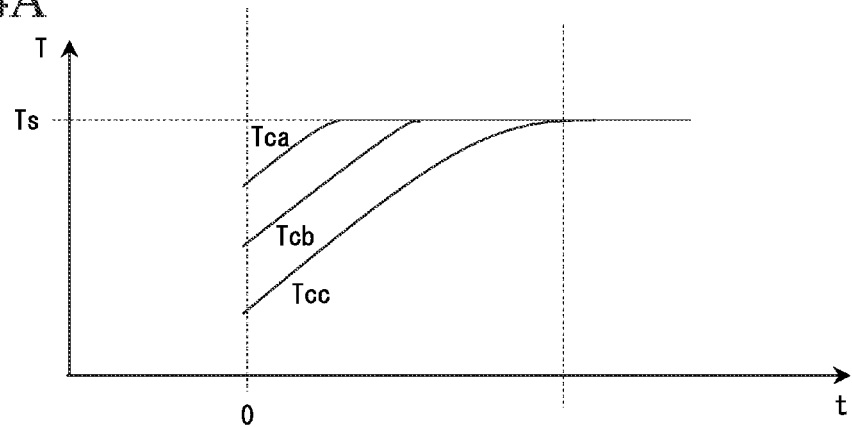
FIG. 4A is a diagram illustrating a temporal change of a cell temperature of each storage cell of each power storage system controlled by an integrated control device in FIG. 1.

In this case, Ts=10104 is obtained from Expression (12), and thus the cell temperatures Tc of the power storage systems 2 temporally change, as shown, in FIG. 4A. That is, the current values of each power storage system 2 are constant even when time passes. Therefore, the temperatures of the power storage systems 2 sequentially reach the cell temperature Ts at the time of saturation from the power storage system with the high temperature Te.

Thus, when the integrated control device 4 receives the request power information from the power loads 3, it can be understood that the integrated control device 4 calculates and obtains the power values respectively burdened on the power storage systems 2 with respect to the total sum value Pt.

Here, in the above-described calculation, the outputs of power storage systems 2 are constant even when time passes. Therefore, as shown in FIG. 4A, the temperatures of the power storage systems sequentially reach the cell temperature Ts at the time of the saturation from the power storage system with the high temperature Te. Therefore, there is a difference among the times at which the cell temperatures of the power storage systems reach Ts.

By performing the control such that all of the cell temperatures of the power storage systems become Ts, the variation of the deterioration in the storage cells of the power storage systems 2 can be controlled, compared to the related art. However, when the difference is smaller, the variation of the deterioration can be further suppressed.

Accordingly, depending on the specification of the power management system 1, the integrated control device 4 may perform Calculation 2 to be described below, instead of Calculation 1 described above.

[Calculation 2]

Figure 4B:
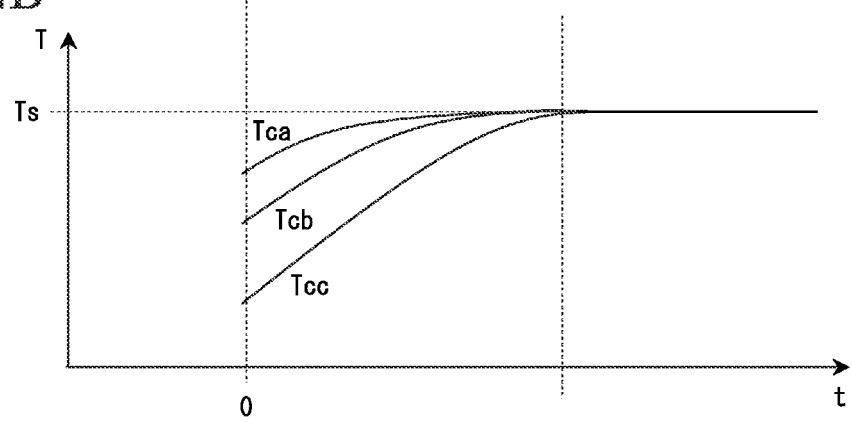
FIG. 4B is a diagram illustrating a temporal change of a cell temperature of each storage cell of each power storage system controlled by the integrated control device in FIG. 1.

In Calculation 1, the outputs of the power storage systems 2 are constant. In Calculation 2, however, calculation is performed such that the outputs are temporally changed and the times at which all of the temperatures of the power storage systems 2 reach the cell temperature Ts at the time of the saturation are substantially the same. That is, the control is performed such that the cell temperatures Tc are changed, as shown in FIG. 4B.

First, the following expressions are obtained from Expression (1), $$(\Delta Tca/\Delta t) = \{Ia \times Ia \times Ra - Ha \times Aa \times (Tca - Tea)\}/(Ca \times Ma) \quad (19)$$

$$(\Delta Tcb/\Delta t) = \{Ib \times Ib \times Rb - Hb \times Ab \times (Tcb - Teb)\}(Cb \times Mb) \quad (20)$$

$$(\Delta Tcc/\Delta t) = \{Ic \times Ic \times Rc - Hc \times Ac \times (Tcc - Tec)\}/(Cc \times Mc) \quad (21)$$

Here, Ha to Hc, Aa to Ac, Ca to Cc, Ma to Mc, and Ra to Rc are fixed values and Tea to Tec are measured values and fixed values. Only Ia to Ic and Tea to Tee are functions that change over time t.

After starting the control, the integrated control device 4 controls the power storage system 2 for which a difference between the cell temperatures Tc and Ts is larger at a given time t so that a temperature change amount of the cell temperature is large, until all of the cell temperatures Tc of the storage cells of the power storage systems 2 substantially become the cell temperature Ts. Then, the following expression is obtained, $$(\Delta Tca/\Delta t):(\Delta Tcb/\Delta t):(\Delta Tcc/\Delta t) = (Ts-Tca):(Ts-Tcb):(Ts-Tcc) \quad (22)$$

When Expression (22) is transformed, the following expression is obtained.

$$(\Delta Tca/\Delta t) \times (Ts - Tcb) \times (Ts - Tcc) = \quad (23)$$
$$(\Delta Tcb/\Delta t) \times (Ts - Tca) \times (Ts - Tcc) =$$
$$(\Delta Tcc/\Delta t) \times (Ts - Tca) \times (Ts - Tcb)$$

When Expression (19) to Expression (21) are substituted into Expression (23) for transformation, Ib and Ic are transformed to the following expressions, respectively.

$$Ib = \sqrt{\frac{Hb \times Ab \times (Tcb - Teb) + \frac{Ts - Tcb}{Ts - Tca} \times \frac{Cb \times Mb}{Ca \times Ma} \{Ia \times Ia \times Ra - Ha \times Aa \times (Tca - Tea)\}}{Rb}} \quad (24)$$

$$Ic = \sqrt{\frac{Hc \times Ac \times (Tcc - Tec) + \frac{Ts - Tcc}{Ts - Tca} \times \frac{Cc \times Mc}{Ca \times Ma} \{Ia \times Ia \times Ra - Ha \times Aa \times (Tca - Tea)\}}{Rc}} \quad (25)$$

Since all of Ia, Ib, and Ic are the values of the output currents, the values of the currents are all described as positive values here.

Further, since the sum of all of the outputs Po of the power storage systems is the total sum value Pt of the powers requested from the power loads 3, the following relation expression can be obtained, as in Calculation 1.

$$Pt = Poa + Pob + Poc \quad (26)$$
$$= \{Ia \times Va \times (Da/100\} +$$
$$\{Ib \times Vb \times (Db/100\} +$$
$$\{Ic \times Vc \times (Dc/100)\}$$

Further, the following expressions can be obtained.

$$Poa = Ia \times Va \times (Da/100) \quad (27)$$

$$Pob = Ib \times Vb \times (Db/100) \quad (28)$$

$$Poc = Ic \times Vc \times (Dc/100) \quad (29)$$

Accordingly, when Expression (24) and Expression (25) are substituted into Expression (26), the following expression is obtained.

$$Pt = \{Va \times (Da/100) \times Ia\} + \left\{ Vb \times (Db/100) \times \sqrt{\frac{Hb \times Ab \times (Tcb - Teb) + \frac{Ts - Tcb}{Ts - Tca} \times \frac{Cb \times Mb}{Ca \times Ma}}{Rb} - \frac{\{Ia \times Ia \times Ra - Ha \times Aa \times (Tca - Tea)\}}{Rb}} \right\} + \left\{ Vc \times (Dc/100) \times \sqrt{\frac{Hc \times Ac \times (Tcc - Tec) + \frac{Ts - Tcc}{Ts - Tca} \times \frac{Cc \times Mc}{Ca \times Ma}}{Rc} - \frac{\{Ia \times Ia \times Ra - Ha \times Aa \times (Tca - Tea)\}}{Rc}} \right\} \quad (30)$$

In Expression (30), only Ia is unknown. The other values are preset values, measured values, or the like, and thus are known fixed values. Accordingly, from Expression (30), the integrated control device 4 can calculate the value of Ia at the given time t.

As in Calculation 1, when the value of Ia is determined, the value of Da is determined to be a specific value. Therefore, Da is a function of Ia. When the value of Ia is determined, the value of Ib is determined from Expression (24). When the value of Ib is determined, the value of Db is determined to be a specific value. Therefore, Db is also a function of Ia. Further, when the value of Ia is determined, the value of Ic is determined from Expression (25). When the value of Ic is determined, the value of Dc is determined to be a specific value. Therefore, Dc is also a function of Ia. Accordingly, each values of Ia can be determined at the given time t from Expression (30).

Thus, when Ia is determined, the values of Ib and Ic can be determined from Expression (24) and Expression (25), respectively. Accordingly, the integrated control device 4 can calculate Poa, Pob, and Poc at the given time t from Expression (27), Expression (28), and Expression (29), respectively. That is, the integrated control device 4 can calculate the power values respectively burdened on the power storage systems 2 with respect to the total sum value Pt of the power requested from the power loads 3 at every predetermined time (for example, every 1 minute) or calculate a burden ratio of each power value burdened on each power storage system 2 at every predetermined time.

As the result of Calculation 1 or Calculation 2 described above, the integrated control device 4 transmits an output signal to the corresponding control device 10 via the signal line 6 so that the powers corresponding to the calculated power values Poa, Pob, and Poc can be output.

Specifically, the integrated control device 4 transmits a first control signal to the control device 11a of the first power storage system 2a via the signal line 6a so that the power Poa can be output. The control device 10a receiving the first control signal performs control such that the power conditioner 9a outputs the power Poa. Further, the integrated control device 4 transmits a second control signal to the control device 10b of the second power storage system 2b via the signal line 6b so that the power Pob can be output. The control device 10b receiving the second control signal performs control such that the power conditioner 9b outputs the power Pob. Furthermore, the integrated control device 4 transmits a third control signal to the control device 10c of the third power storage system 2c via the signal line 6c so that the power Poc can be output. The control device 10c receiving the third control signal performs control such that the power conditioner 9c outputs the power Poc.

Through the above-described control, the integrated control device 4 receiving the power output from each power storage system distributes the power corresponding to the total sum value Pt into the power values P1 and P2 and outputs the power values P1 and P2 to the corresponding power loads 3, respectively.

When Calculation 1 is used and the integrated control device 4 calculates Poa, Pob, and Pob once, the recalculation may not necessarily be performed until the total sum value Pt of the power requested from the power loads 3 is changed.

On the other hand, when Calculation 2 is used, the integrated control device 4 transmits the power storage system information request signal to each power storage system 2 at intervals of a predetermined time (for example, 1 minute) until the cell temperatures Tca, Tcb, and Tcc substantially reach the cell temperature Ts at the time of the saturation. Then, it is necessary to perform the above-described control whenever power storage system information including the temporally changed cell temperature Tc is received from the control device 10 of each power storage system 2. When all of the cell temperatures Ta, Tb, and Tc substantially reach Ts, the integrated control device 4 ends the transmission of the power storage system information request signal.

Accordingly, the integrated control device 4 can perform simpler control when performing the control using Calculation 1 than when performing the control using Calculation 2, and the power consumption can be further reduced.

In the control performed using Calculation 2, however, by changing the value of the output of each power storage system 2 at every predetermined time, the cell temperatures Tc of the storage cells of each power storage system 2 can substantially simultaneously reach Ts. Accordingly, from the viewpoint of controlling the variation of the deterioration in the storage cells of each power storage system 2, the result of Calculation 2 is superior to that of Calculation 1.

Depending on the specification of the power management system 1, it is desirable to appropriately select Calculation 1 or Calculation 2.

In the power management system 1 described above, the storage cells used at higher temperature can be prevented from deteriorating earlier due to the fact that the storage cells of one power storage system among the plurality of power storage systems installed in different places are used at the higher temperature, compared to the other power storage systems. Accordingly, the power management system 1 can perform the control such that the storage cells can deteriorate substantially uniformly by controlling the variation of the deterioration in the storage cells between the power storage systems.

The invention is not limited to the above-described embodiment, but may be modified in various ways without departing from the scope of the invention. For example, the number of power storage systems 2 and the number of power loads 3 are not limited to the above-described numbers, but may be changed appropriately depending on design. When the configurations of the power storage systems are different, the values of the respective variables are also different. However, even in this case, the control can be performed such that the cell temperatures Tc of the storage cells of each power storage system 2 substantially reach Ts.

Even when the configurations of the power storage systems are the same, the values of the respective variables may be different. For example, the open circuit voltages (that is, OCV) of the respective storage cells of a given power storage system may be different. Accordingly, when the open circuit voltages of the respective storage cells are each measured, the sum of the open voltages is calculated, and the sum is set as the voltage value V of the corresponding storage cell module 7, the voltage values Va, Vb, and Vc may be different.

A map indicating the characteristics of the corresponding power conditioner may be stored in the memory device of each power storage system 2, information regarding the map may be added to the power storage system information, and the power storage system information may be transmitted to the integrated control device 4. In this case, since a memory device that stores the map may not be provided inside the integrated control device 4, the integrated control device 4 can be miniaturized. When a power storage system is further added as an additional system to the power management system 1, it is not necessary to change the integrated control device 4. Therefore, there is an advantage in the system management.

The cell temperature Tc has been described as the average value, but the cell temperature of the storage cell at the highest temperature in the storage cell module may be used. In this case, since all of the cell temperatures of the plurality of storage cells in the storage cell module can be set to be lower than the saturation value Ts, it is possible to effectively prevent the storage cell module from deteriorating.

In one power storage system 2, the storage cell module including one assembled cell in series has been described above. However, a plurality of assembled cells may be provided and may be configured to be connected in parallel. In this case, in all of the storage cells, the temperature of the storage cell with the highest change ratio of the cell temperature per time may be set as Tc. This is because a heat dissipation effect is low in a storage cell with a low change ratio.

Industrial Applicability

In the above-described power management system, it is possible to perform the control such that the variation of the deterioration in the storage cells between power sources can deteriorate substantially uniformly.

Reference Signs List 1 power management system (energy management system)
2 (2a, 2b, 2c) power storage system
3 (3a, 3b) lower load
4 integrated control device
5 (5a, 5b, 5c, 5d, 5e) power line
6 (6a, 6n, 6c, 6d, 6e) signal line
7 storage cell module
8 BMS
9 power conditioner
10 control device
11 temperature sensor

The invention claimed is:

1. A power management system comprising:
a first power source that includes a first storage cell;
a second power source that includes a second storage cell;
a power load that is driven with first power output by the first power source and second power output by the second power source; and
an integrated control device that controls the first power and the second power such that a first cell temperature of the first storage cell is substantially the same as a second cell temperature of the second storage cell,
wherein the power load transmits request power information regarding power necessary for the driving to the integrated control device, and
wherein the integrated control device receiving the request power information performs the control by calculating values of the first power and the second power such that the integrated control device acquires first storage cell intrinsic information including the first cell temperature and first temperature of a disposition place of the first power source in regard to the first storage cell from the first power source, acquires second storage cell intrinsic information including the second cell temperature and second temperature of a disposition place of the second power source in regard to the second storage cell from the second power source, performs calculation using the request power information, the first storage cell intrinsic information, and the first temperature,
wherein the first storage cell intrinsic information includes at least a voltage value of the first storage cell, an internal resistance value of the first storage cell, a heat transfer coefficient of the first storage cell, a heat transfer area of the first storage cell, a specific heat of the first storage cell, and a mass of the first storage cell, and
wherein the second storage cell intrinsic information includes at least a voltage value of the second storage cell, an internal resistance value of the second storage cell, a heat transfer coefficient of the second storage cell, a heat transfer area of the second storage cell, a specific heat of the second storage cell, and a mass of the second storage cell.

2. The power management system according to claim 1, wherein the first power source includes a first power conditioner that receives a direct-current output of the first storage cell, converts the direct-current output into an alternating current, and outputs the alternating current as the first power, and
wherein the second power source includes a second power conditioner that receives a direct-current output of the second storage cell, converts the direct-current output into an alternating current, and outputs the alternating current as the second power.

3. The power management system according to claim 2, wherein the first storage cell is a first assembled cell in which a plurality of storage cells are connected in series and the second storage cell is a second assembled cell in which a plurality of storage cells are connected in series,
wherein the first cell temperature is a cell temperature of the storage cell indicating a highest temperature among the plurality of storage cells of the first assembled cell, and
wherein the second cell temperature is a cell temperature of the storage cell indicating a highest temperature among the plurality of storage cells of the second assembled cell.

* * * * *